(12) United States Patent
Svyatkovskiy et al.

(10) Patent No.: US 10,983,761 B2
(45) Date of Patent: Apr. 20, 2021

(54) DEEP LEARNING ENHANCED CODE COMPLETION SYSTEM

(71) Applicant: MICROSOFT TECHNOLOGY LICENSING, LLC., Redmond, WA (US)

(72) Inventors: Alexey Svyatkovskiy, Bellevue, WA (US); Shengyu Fu, Redmond, WA (US); Neelakantan Sundaresan, Bellevue, WA (US); Ying Zhao, Bellevue, WA (US)

(73) Assignee: MICROSOFT TECHNOLOGY LICENSING, LLC, Redmond, WA (US)

(*) Notice: Subject to any disclaimer, the term of this patent is extended or adjusted under 35 U.S.C. 154(b) by 0 days.

(21) Appl. No.: 16/377,789

(22) Filed: Apr. 8, 2019

(65) Prior Publication Data

US 2020/0249918 A1 Aug. 6, 2020

Related U.S. Application Data

(60) Provisional application No. 62/800,460, filed on Feb. 2, 2019.

(51) Int. Cl.
| | |
|---|---|
| G06F 9/44 | (2018.01) |
| G06F 8/33 | (2018.01) |
| G06N 3/08 | (2006.01) |
| G06F 16/901 | (2019.01) |
| G06F 17/18 | (2006.01) |
| G06F 8/41 | (2018.01) |
| G06N 3/04 | (2006.01) |

(52) U.S. Cl.
CPC ............... *G06F 8/33* (2013.01); *G06F 8/42* (2013.01); *G06F 16/9027* (2019.01); *G06F 17/18* (2013.01); *G06N 3/0472* (2013.01); *G06N 3/084* (2013.01)

(58) Field of Classification Search
CPC . G06F 8/33; G06N 3/0472; G06N 3/084–088
USPC ......................................................... 717/110
See application file for complete search history.

(56) References Cited

U.S. PATENT DOCUMENTS

| | | | | |
|---|---|---|---|---|
| 10,268,671 | B2 * | 4/2019 | Kaiser | .................. G06F 40/211 |
| 10,318,882 | B2 * | 6/2019 | Brueckner | .............. H04L 67/10 |
| 10,423,410 | B1 * | 9/2019 | Goyal | ...................... G06N 3/08 |
| 10,481,879 | B2 * | 11/2019 | Stevens | ..................... G06F 8/35 |
| 10,671,355 | B2 * | 6/2020 | Banuelos | ............... G06N 20/00 |
| 10,754,645 | B2 * | 8/2020 | Chen | ......................... G06F 8/77 |

(Continued)

FOREIGN PATENT DOCUMENTS

CN 107506414 A 12/2017

OTHER PUBLICATIONS

Shobhit Chaurasia; "Dialog for Natural Language to Code"; Master of Science in Computer Science, The University of Texas at Austin; May 2017.*

(Continued)

*Primary Examiner* — Francisco J Aponte

(57) ABSTRACT

A code completion tool uses a deep learning model to predict the likelihood of a method completing a method invocation. In one aspect, the deep learning model is a LSTM trained on features that represent the syntactic context of a method invocation derived from an abstract tree representation of the code fragment.

20 Claims, 6 Drawing Sheets

(56) References Cited

U.S. PATENT DOCUMENTS

| | | | |
|---|---|---|---|
| 2008/0295085 A1* | 11/2008 | Rachamadugu | G06F 8/75 717/159 |
| 2012/0317557 A1* | 12/2012 | Garrett | G06F 8/433 717/146 |
| 2017/0180276 A1* | 6/2017 | Gershony | H04L 51/18 |
| 2017/0212829 A1* | 7/2017 | Bales | G06F 11/3612 |
| 2018/0150742 A1* | 5/2018 | Woulfe | G06F 11/008 |
| 2019/0121621 A1* | 4/2019 | Aggarwal | G06F 8/42 |
| 2019/0138904 A1* | 5/2019 | Millius | G06F 40/35 |
| 2019/0180165 A1* | 6/2019 | Vinyals | G06N 3/02 |
| 2019/0220253 A1* | 7/2019 | Pradhan | G06N 3/08 |
| 2019/0228319 A1* | 7/2019 | Gupta | G06N 5/04 |
| 2019/0243617 A1* | 8/2019 | Stevens | G06F 8/35 |
| 2019/0303109 A1* | 10/2019 | Fu | G06F 8/436 |
| 2019/0377560 A1* | 12/2019 | Papageorgiou | G06F 9/44505 |
| 2020/0097261 A1* | 3/2020 | Smith | G06F 40/30 |
| 2020/0104102 A1* | 4/2020 | Brockschmidt | G06F 8/34 |
| 2020/0111012 A1* | 4/2020 | Wan | G06F 8/33 |
| 2020/0184349 A1* | 6/2020 | Bhokare | G06F 8/33 |

OTHER PUBLICATIONS

Yixiao Yang et al.; "A Language Model for Statements of Software Code"; 2017 32nd IEEE/ACM International Conference on Automated Software Engineering (ASE).*

Xing Hu et al.; "Deep-AutoCoder: Learning to Complete Code Precisely with Induced Code Tokens"; 2019 IEEE 43rd Annual Computer Software and Applications Conference (COMPSAC).*

Son Nguyen et al.; "Combining Program Analysis and Statistical Language Model for Code Statement Completion"; 2019 34th IEEE/ACM International Conference on Automated Software Engineering (ASE).*

Miltiadis Allamanis et al.; "Learning to Represent Programs With Graphs"; ICLR May 2018.*

Junwei Wu et al.; "Code recommendation for Android development: how does it work and what can be improved?"; Science China Information Sciences—Sep. 2017, vol. 60.*

Yixiao Yang et al.; "Improve Language Modelling for Code Completion through Learning General Token Repetition of Source Code" ; SEKE-2019.*

Anh Tuan Nguyen et al.; "A Deep Neural Network Language Model with Contexts for Source Code"; SANER 2018, Campobasso, Italy Technical Research Papers—2018 IEEE.*

Miltiadis Allamanis et al.; "A Survey of Machine Learning for Big Code and Naturalness"; ACM Computing Surveys, vol. 51, No. 4, Article 81. Publication date: Jul. 2018.*

Nguyen et al., "A deep neural network language model with contexts for source code", in International Conference on Software Analysis, Evolution and Re-engineering, Mar. 20, 2018, pp. 323-334.

"International Search Report and Written Opinion Issued in PCT Patent Application No. PCT/US20/014863", dated May 8, 2020, 15 Pages.

Yahav, Eran, "From Programs to Interpretable Deep Models and Back", In International Conference on Computer Aided Verification, Jul. 14, 2018, pp. 27-37.

Zimdars, et al., "Using temporal data for making recommendations", In Proceedings of the 17th Conference in Uncertainty in Artificial Intelligence, University of Washington, Seattle, Washington, USA, Aug. 2, 2001, pp. (580-588).

"Sequence to Sequence Learning in Neural Networks", In Journal Advances in Neural Information Processing Systems 27 (NIPS 2014). Retrieved From http://papers.nips.cc/paper/5346-sequence-to-sequence-learning-with-neural-networks.pdf, 2013, 9 Pages.

Alnusair, "Effective API Navigation and Reuse", In Proceedings of the IEEE International Conference on Information Reuse and Integration, IRI 2010, Aug. 4, 2010, 6 Pages.

Bruch, et al., "Learning from Examples to Improve Code Completion Systems", In Proceedings of the 7th joint meeting of the European Software Engineering Conference and the ACM SIGSOFT International Symposium on Foundations of Software Engineering, 2009, Aug. 24, 2009, pp. (213-222).

D'Souza et al., "Collective Intelligence for Smarter API Recommendations in Python", In Proceedings of IEEE 16th International Working Conference on Source Code Analysis and Manipulation (SCAM), 2016, vol. 1, Retrieved From: https://arxiv.org/pdf/1608.08736.pdf, pp. (51-60).

Dean, et al., "Large Scale Distributed Deep Networks", In Advances in Neural Information Processing Systems 25: 26th Annual Conference on Neural Information Processing Systems 2012. Proceedings of a meeting held Dec. 3-6, 2012, Dec. 3, 2012, pp. (1-11).

Gers, et al., "Learning to Forget Continual Prediction with LSTM", In Proceedings of ICANN'99 International Conference on artificial Neural Networks, Edinburg, Scottland, vol. 2, IEE, London, 1999, 7 Pages.

Gvero, et al., "Complete Completion using Types and Weights", In Proceedings of Conference on Programming Language Design and Implementation, PLDI '13, Seattle, WA, USA, ACM SIGPLAN 2013, Jun. 16, 2013.

Inan, et al., "Tying Word Vectors and Word Classifiers: A Loss Framework for Language Modeling", Retrieved From: https://arxiv.org/abs/1611.01462, Mar. 2017, 13 Pages.

Kim, et al., "A highly scalable Restricted Boltzmann Machine FPGA implementation", In Proceedings of International Conference on Field Programmable Logic and Applications. Aug. 31, 2009, 6 Pages.

Krizhevsky, et al., "ImageNet Classification with Deep Convolutional Neural Networks", In Proceedings of Advances in Neural Information Processing Systems 25 (NIPS 2012), 9 Pages.

Mao et al., "Deep Captioning with Multimodal Recurrent Neural Networks (m-RNN)", In Proceedings of 3rd International Conference on Learning Representations, ICLR 2015, May 7, 2015, 17 Pages.

Marasoiu, et al., "An empirical investigation of code completion usage by professional software developers", In Proceedings of the 26th Annual Workshop of the Psychology of Programming Interest Group, PPIG 2015, Bournemouth, UK, Jul. 15, 2015, 12 Pages.

Mikolov, et al., "Distributed Representations of Words and Phrases and the Compositionality", In Proceedings of Advances in Neural Information Processing Systems 26 (NIPS 2013), 2013.

Mobasher, et al., "Using sequential and non-sequential patterns in predictive Web usage mining tasks", Proceedings of the 2002 IEEE International Conference on Data Mining (ICDM 2002), Dec. 9, 2002, pp. (669-672).

Murphy, et al., "How are Java software developers using the Elipse IDE?", Published in IEEE Software ( vol. 23 , Issue: 4 , Jul.-Aug. 2006 ), pp. (76-83).

Perelman, et al., "Type-Directed Completion of Partial Expressions", In Proceedings of the 33rd ACM SIGPLAN Conference on Programming Language Design and Implementation, PLDI '12, Jun. 11, 2012, pp. (275-285).

Proksch et al., "Intelligent Code Completion with Bayesian Networks", Published in Journal ACM Transactions on Software Engineering and Methodology (TOSEM),vol. 25 Issue 1, Nov. 2015 ,Article No. 3, Nov. 2015, 31 Pages.

Radev, et al., "Evaluating Web-based Question Answering Systems", In Proceedings of the Third International Conference on Language Resources and Evaluation, LREC 2002, May 29, 2002, pp. (1153-1156).

Raffel, et al., "Feed-Forward Networks with Attention Can Solve Some Long-Term Memory Problems", Retrieved From: https://arxiv.org/pdf/1512.08756.pdf, 2015, 6 Pages.

Raychev, et al., "Code Completion with Statistical Language Models", In Proceedings of Conference on Programming Language Design and Implementation, PLDI '14, ACM SIGPLAN, Edinburgh, United Kingdom, Jun. 9, 2014, 10 Pages.

Shani, et al., "An MDP-Based Recommender System", In Proceedings of the 18th Conference in Uncertainty in Artificial Intelligence, UAI'02, University of Alberta, Edmonton, Alberta, Canada, 2002, Aug. 1, 2002, pp. (453-460).

Socher, et al., "Recursive Deep Models for Semantic Compositionality Over a Sentiment Treebank", In Proceedings of the 2013

(56) References Cited

OTHER PUBLICATIONS

Conference on Empirical Methods in Natural Language Processing, EMNLP 2013, Oct. 18, 2013, pp. (1631-1642).

Zhong, et al., "MAPO: Mining and Recommending API Usage Patterns", In Proceedings of ECOOP 2009—Object-Oriented Programming, 23rd European Conference, Genoa, Italy, Jul. 6, 2009, 25 Pages.

"Python Tools for Visual Studio", Retrieved From: https://github.com/Microsoft/PTVS, Retrieved Date: May 2, 2019, 2 Pages.

"Visual Studio intellicode", Retrieved From: https://marketplace.visualstudio.com/items?itemName=VisualStudioExptTeam.vscodeintellicode, Retrieved Date: May 2, 2019, 2 Pages.

Goyal, et al., "Accurate, Large Minibatch SGD: Training ImageNet in 1 Hour", In Repository of arXiv 1706.02677v2, Apr. 30, 2018, 12 Pages.

\* cited by examiner

DEEP LEARNING ENHANCED CODE COMPLETION SYSTEM

CROSS-REFERENCE TO RELATED APPLICATIONS

The present application claims the benefit of the earlier filed provisional application having Ser. No. 62/800,460 filed on Feb. 2, 2019, which is hereby incorporated by reference.

BACKGROUND

Software development environments are often used to aid software developers (i.e., users, programmers, etc.) to develop program code. The software development environment may include a source code editor and other tools that a developer utilizes to write and test their programs. Some software development environments include a code completion feature that provides assistance while the developer is editing code by automatically presenting a list of possible candidates based on one or more characters (e.g., letters, symbols, etc.) that a developer has typed into a source code editor. A popup menu may appear with several suggested code elements that the developer may utilize. This assistance is beneficial since it speeds up the development time and reduces common errors, such as typos. However, the automatic code completion feature may be problematic when there is a large list of candidates which may not be relevant and/or which may be too lengthy for a developer to browse through to find the right element.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

A code completion system uses a deep learning model to generate candidates to automatically complete a method invocation. The deep learning network model is trained to predict the most likely method to complete a method invocation from ordered sequences of tokens representing the syntactic representation of the context of the method invocation from historical usage patterns of the method invocation. In one aspect, the deep learning model is a long short term memory model (LSTM). The LSTM is capable of learning order dependence in sequential patterns such as the ordered sequence of tokens obtained from an abstract syntax tree representing a code snippet containing the method invocation. The ordered sequence of tokens includes the syntax nodes and tokens from the abstract syntax tree and the runtime datatype of the variable assigned the result of the method invocation.

These and other features and advantages will be apparent from a reading of the following detailed description and a review of the associated drawings. It is to be understood that both the foregoing general description and the following detailed description are explanatory only and are not restrictive of aspects as claimed.

DETAILED DESCRIPTION

Overview

The subject matter disclosed pertains to the generation of candidates to automatically complete a method invocation using a deep learning network model. The deep learning network model is trained to predict the most likely method to complete a method invocation from ordered sequences of tokens corresponding to the syntactic representation of the context of a method invocation. In one aspect, the deep learning model is a Long Short-Term Memory (LSTM) network. The LSTM is capable of learning order dependence in sequential patterns such as the ordered sequence of tokens obtained from an abstract syntax tree representing a code snippet containing a method invocation. The ordered sequence of tokens includes the syntactic context and the runtime data type of the variable assigned the result of the method invocation.

A method invocation is the issuance of a call to a method, field or property of a class. The method invocation may be invoked with zero or more parameters. A method invocation includes member access expressions, module function invocations, and remote method invocations, such as application programming interfaces (APIs). A member access expression is an expression that represents access to a field or property of a class. A module function invocation is a call to a method or property of a class including its parameters and includes remote procedure calls, such as application programming interface calls.

A class may include a large number of methods and/or properties thereby making it impractical to list all the methods and properties of a class as candidates. In order to generate the candidates more likely to complete a source code statement invoking a method, the context in which the method is invoked is used to predict the more likely candidates. In one aspect, an ordered sequence of tokens based on an abstract syntactic representation of the source code preceding a method invocation and the method invocation is used as the basis to predict the candidates. The ordered sequence of tokens representing the surrounding source code context can be obtained from an abstract syntactic representation of the method invocation, such as from an abstract syntax tree.

Machine learning uses different types of statistical methods to learn from data and to predict future decisions. Traditional machine learning includes classification models, data mining, Bayesian networks, Markov models, clustering, and visual data mapping. Deep learning differs from machine learning since it uses multiple stages of data processing through many hidden layers of a neural network to learn and interpret the features and the relationships between the features. Deep learning embodies neural networks which differs from the traditional machine learning techniques that do not use neural networks.

Attention now turns to a further discussion of the system, devices, components, and methods utilized in a code completion system.

Machine Learning Code Completion System

Figure 1:
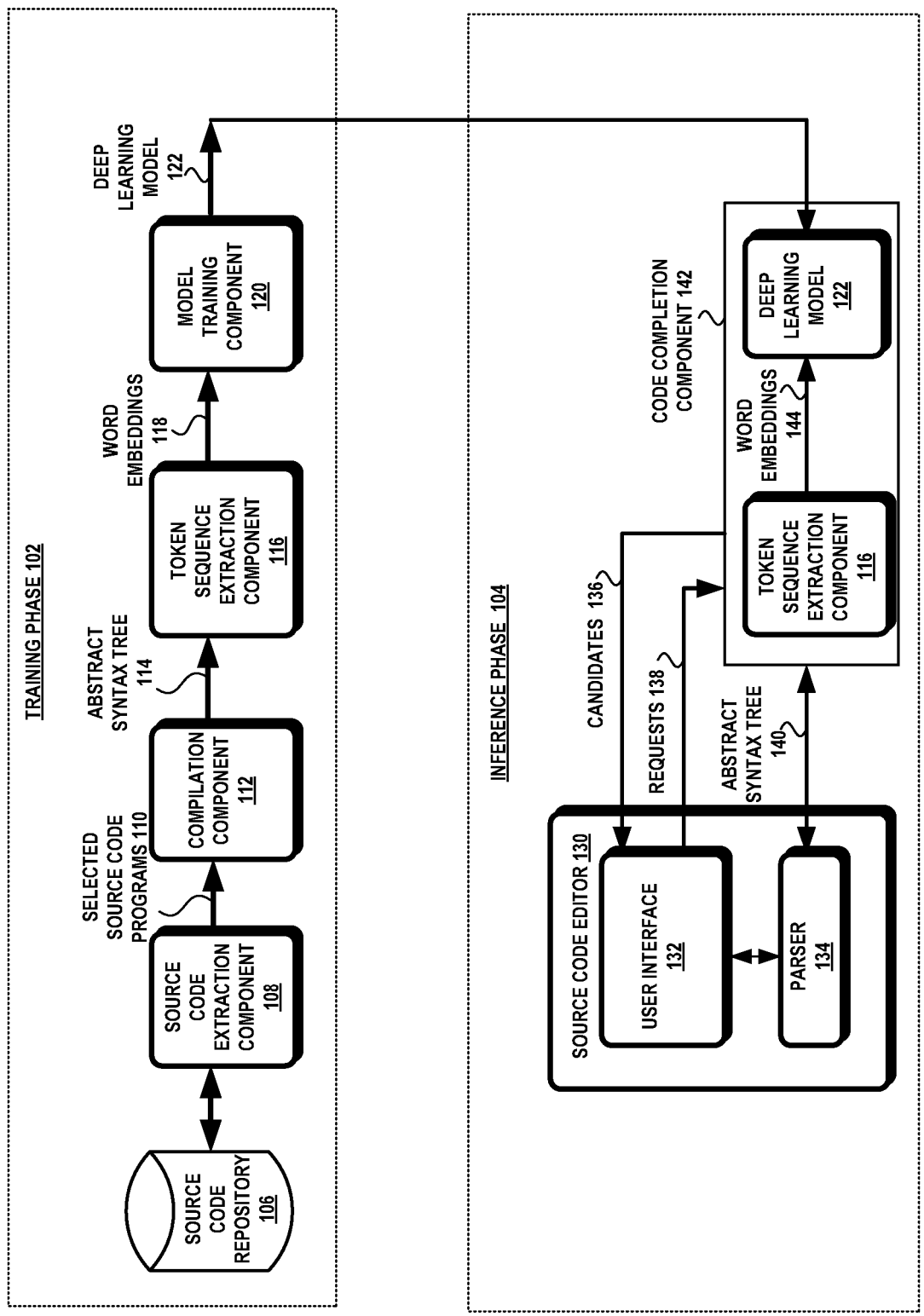
FIG. 1 illustrates an exemplary code completion system having a training phase that generates a deep learning model and an inference phase that uses the deep learning model to predict one or more candidates to complete a method invocation.

FIG. 1 illustrates a block diagram of an exemplary code completion system 100 in which various aspects of the invention may be practiced. As shown in FIG. 1, system 100 includes a training phase 102 which trains a deep learning model 122 and an inference phase 104 that utilizes the deep learning model 122. The training phase 102 may utilize a source code extraction component 108, a compilation component 112, a token sequence extraction component 116, and a model training component 120.

In the training phase 102, the source code extraction component 108 extracts source code programs 110 from a source code repository 106 to obtain training and validation datasets. The source code repository 106 is a file archive and web hosting facility that stores large amounts of source code either privately or publicly. The source code repository can be structured as a version control system, such as GIT, Mercurial, etc. The source code programs residing in the source code repository 106 vary and may be written in different programming languages. The source code extraction component 108 obtains source code programs written in the same programming language that utilizes the same context-free grammar for the training and validation datasets. A context-free grammar is a set of rules that describe all possible strings in a formal language. The source code programs can come from different domains, such as without limitation, scientific computing, web development, dataflow programming, machine learning, and the like but are written in the same programming language.

A compilation component 112 transforms each of the selected source code programs 110 into an abstract syntax tree 114. In one aspect, the compilation component 112 may be a front-end compiler, a parser, or a language compiler. An abstract syntax tree 114 represents the syntactic structure of the program in a hierarchical or tree structure. The abstract syntax tree 114 is an n-ary tree data structure that includes nodes that represent a construct in the grammar of the programming language of a program. The abstract syntax tree 114 includes one root node, multiple internal nodes, and multiple leaf nodes. The internal nodes are labeled by operators and the leaf nodes represent the operands of the operators. A leaf node contains a token representing the operand of an operator and an internal node includes a token representing the operator. A token is a symbol that represents an operand and an operator.

The abstract syntax tree 114 for a selected source code program 110 is passed to the token sequence extraction component 116. The token sequence extraction component 116 uses a portion of the abstract syntax tree 114 that represents the context of a method invocation as input for training the deep learning model. The abstract syntax tree 114 is traversed in depth-first order to extract a T-ordered sequence of tokens representing the context of the method invocation. The T-ordered sequence of tokens includes the tokens immediately preceding the initiation of a method invocation. The tokens representing the method invocation include the method invocation and the runtime data type of the variable assigned the return value of the method invocation. The runtime data type of the variable assigned the return value of the method invocation may be inferred using traditional compiler type inference methods if the data type is not already declared in the source code program. The number of tokens, T, in the ordered sequence is pre-configured and a tunable parameter based on various factors, such as the model's prediction accuracy.

The feature vectors or T-ordered sequences of tokens are then mapped into numeric vectors and then into a word embedding. A word embedding is a learned representation for the text-based tokens where words that have a common meaning have a common representation. Various natural language processing techniques may be used to generate the word embeddings. In one aspect, Word2vec, is used to produce the word embeddings. Word2vec is a two-layer neural network trained to produce a vector space from a large dataset of text, such as the vocabulary of the tokens associated with the ordered sequences.

The word embeddings 118 are input to the model training component 120. The model training component 120 uses the word embeddings 118 to generate a deep learning model 122 capable of producing potential candidates likely to complete a method invocation given a particular code snippet. The deep learning model 122 predicts the method best suited to complete a method invocation, given code snippet C, vocabulary V, and the set of all possible methods M in V, by finding the method m*=argmax (P(m|C)), for all m∈M. In one aspect, the model training component 120 trains a LSTM. The LSTM is trained offline with the word embeddings 118 and tuned to achieve a desired performance.

The deep learning model 122 is used in the inference phase 104 of the code completion system. In one or more aspects, the inference phase 104 may be embodied as a function or feature integrated into a source code editor, integrated development environment (IDE), and/or standalone application. Code completion may be embodied as a tool or feature that can be an add-on, plug-in, extension and/or component of a source code editor and/or IDE. In one aspect, the inference phase 104 includes a source code editor 130 having a user interface 132 and a parser 134 and a code completion component 142. The code completion component 142 includes a token sequence extraction component 116 that generates word embeddings from the abstract syntax tree 140 and passes the word embeddings to the deep learning model 122.

In one aspect, a source code editor 130 may include a user interface 132 and a parser 134. The user interface 132 includes a set of features or functions for developing (e.g., writing, editing, testing) a source code program. The user interface 132 may utilize a pop-up window to present a list of possible candidates for completion thereby allowing a developer to browse through the candidates and to select one from the list. The parser 134 reads the source code in the source code editor 130 and generates a corresponding abstract syntax tree 140. The parser 134 also updates the abstract syntax tree 140 as the developer creates and edits the source code in the source code editor 130.

At certain points in the editing process, the user interface 132 will detect that the user has entered a particular character which will initiate code completion. This character is referred to as a marker character. In one aspect, the marker character may be a period, ".", placed after a class name. The user interface 132 will then send requests 138 for candidates from the code completion component 142 to present to the developer.

The code completion component 142 receives the requests 138 for candidates to complete a method invocation. The token sequence extraction component 116 extracts the T-ordered sequence of tokens from the abstract syntax tree 140 representing the source code context of the initiation of a method invocation in the source code editor. The T-ordered sequence of tokens in this case include the marker character and the tokens preceding the marker character.

The T-ordered sequence of tokens is transformed into word embeddings 144, as noted above, and then input into the deep learning model 122 which generates probabilities for a number of candidates. The candidates are ranked according to their respective probability with the candidates having the highest probability at the top. A select number of candidates 136 is then returned to the source code editor 130 and displayed in the user interface 132.

It should be noted that FIG. 1 shows components of the system in one aspect of an environment in which various aspects of the invention may be practiced. However, the exact configuration of the components shown in FIG. 1 may not be required to practice the various aspects and variations in the configuration shown in FIG. 1 and the type of components may be made without departing from the spirit or scope of the invention. For example, the training phase 102 may be executed in one computing environment and the inference phase 104 may be executed in the same computing environment or in a separate computing environment as the training phase 102. The various computing environment is described in further detail below.

Attention now turns to a description of one aspect of the architecture of the neural network model.

A LSTM is a type of recurrent neural network capable of learning order dependence in sequential patterns using a gradient-based learning algorithm. In general, the LSTM architecture includes an input layer, one or more hidden layers in the middle with recurrent connections between the hidden layers at different times, and an output layer. Each layer represents a set of nodes and the layers are connected with weights. The input layer $x_t$ represents an index at position t in a vocabulary |V| and the output layer $y_t$ produces a probability distribution that the token at position t in the vocabulary is likely to complete a method invocation. The hidden layers $h_t$ maintain a representation of the history of the training data. Gating units are used to modulate the input, output, and hidden-to-hidden transitions in order to keep track of a longer history of the training data.

The LSTM is used to predict a token m*, conditional on an ordered sequence of syntax tokens, $c_t$, t=0 . . . T, corresponding to the terminal nodes of the AST of code snippet C, plus the special end-of-sequence token ".". The LSTM is defined as follows:

$$x_t = Lc_t, \quad (1)$$

$$h_t = f(x_t, h_{t-1}), \quad (2)$$

$$P(m|C) = y_t = \text{softmax}(W h_t + b), \quad (3)$$

$$m^* = \text{argmax}(P(m|C)), \quad (4)$$

where:

$x_t$ represents a word encoding of a token $c_t$ in the word embedding matrix L, $L \in R^{dx \times |V|}$, t represents a temporal dimension, such as a position of a token in the ordered sequence of syntax tokens, $d_x$ is the word embedding dimension,

|V| is the size of the vocabulary, $h_t$ is the next hidden state and is based on the function f $(x_t, h_{t-1})$, the function f $(x_t, h_{t-1})$ represents the stacked LSTM taking the current input, $x_t$, and the previous hidden state, $h_{t-1}$, to produce the next hidden state, $h_t$, $W \in R^{|V| \times d_h}$ is the output projection matrix, $b \in R^{|V|}$ is the bias, $d_h$ is the size of the hidden state of the LSTM, softmax is a function that normalizes a vector of real numbers into a probability distribution, and argmax is an abbreviation for arguments of the maxima and in equation (3) represents the index in the vocabulary representing the token having the highest probability.

Figure 2:
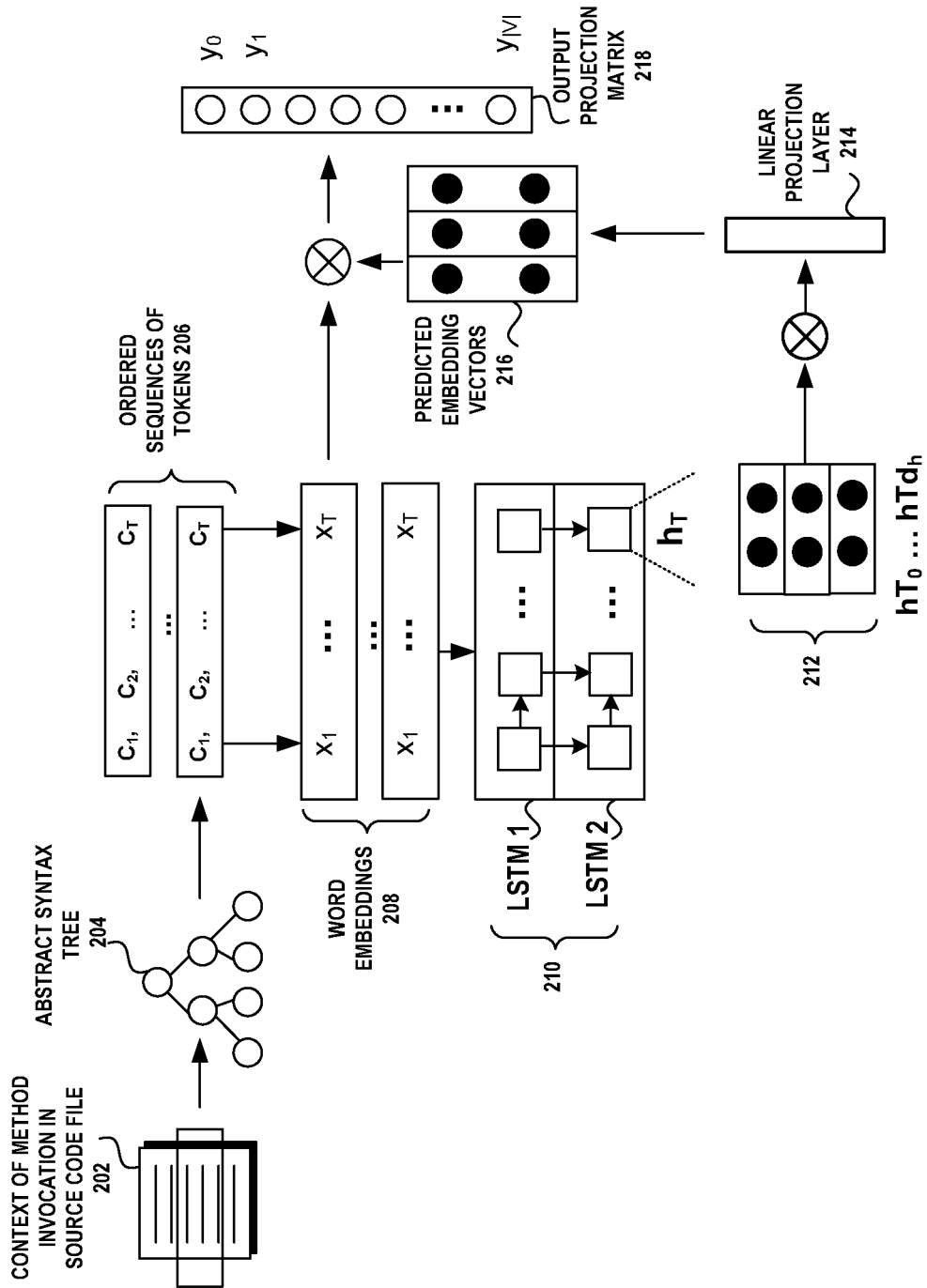
FIG. 2 is a schematic diagram illustrating an embodiment of an architecture of the deep learning model.

FIG. 2 illustrates an exemplary architecture of the deep learning model 200. The neural network model 210 is trained on word embeddings 208 representative of the syntactic structure of the context of a completed method invocation. The word embeddings 208 are generated from multiple ordered sequences of tokens 206 generated from a depth-first order traversal of an abstract syntax tree 204. An ordered sequence of tokens represents the context of the completed method invocation from a source code program 202.

The deep learning may use a two-stack LSTM 210 (LSTM1, LSTM2) with 100 hidden units. However, it should be noted that the techniques disclosed herein are not limited to a two-stack LSTM implementation and that other configurations are contemplated to achieve a desired performance (e.g., 2-stack or 3-stack LSTM with 64 hidden units).

The LSTMs are trained interactively, making multiple passes over the training dataset before converging to a minimum. Each training iteration includes forward propagation, loss calculation, backpropagation steps followed by updating the weights. A Stochastic Gradient Descent (SGD) method is the optimization algorithm used to find the values of parameters of the function that minimizes the loss function. The loss function maybe a categorical cross-entropy algorithm. A backpropagation through time (BPTT) algorithm maybe used to update the weights.

Conventionally, in sequence classification tasks, the inputs and the outputs are treated as isolated entities with no association between them. In this deep learning architecture 200, there is a semantic relationship between the inputs and outputs which can be utilized to reduce the size of the deep learning model. As such, the input word embedding matrix 208 is reused in the output projection matrix 218 in order to reduce the number of trainable variables in the model.

A linear projection layer 214 is a matrix $A=(a)_{ij} \in R^{d_h \times d_x}$. The linear projection layer 214 is used to generate the predicted embedding vectors 216 from the hidden state of LSTM at the last temporal step T as $l_j^{pred} = \Sigma_i h_{Ti} a_{ij}$. The hidden state vector $h_T \in R^{d_h}$ encodes information learned by LSTM from the feature vector relevant to the method completion. Finally, we obtain a probability distribution of the methods by first getting the unnormalized predictions as $y_k = \Sigma_j l_{kj} l_j^{pred} + b_k$, where $b_k$, k=0 . . . |V|−1 is the bias vector, and then normalizing them using softmax function.

Attention now turns to description of the various exemplary methods that utilize the system and device disclosed herein. Operations for the aspects may be further described with reference to various exemplary methods. It may be appreciated that the representative methods do not necessarily have to be executed in the order presented, or in any particular order, unless otherwise indicated. Moreover, various activities described with respect to the methods can be executed in serial or parallel fashion, or any combination of serial and parallel operations. In one or more aspects, the method illustrates operations for the systems and devices disclosed herein.

Figure 3:
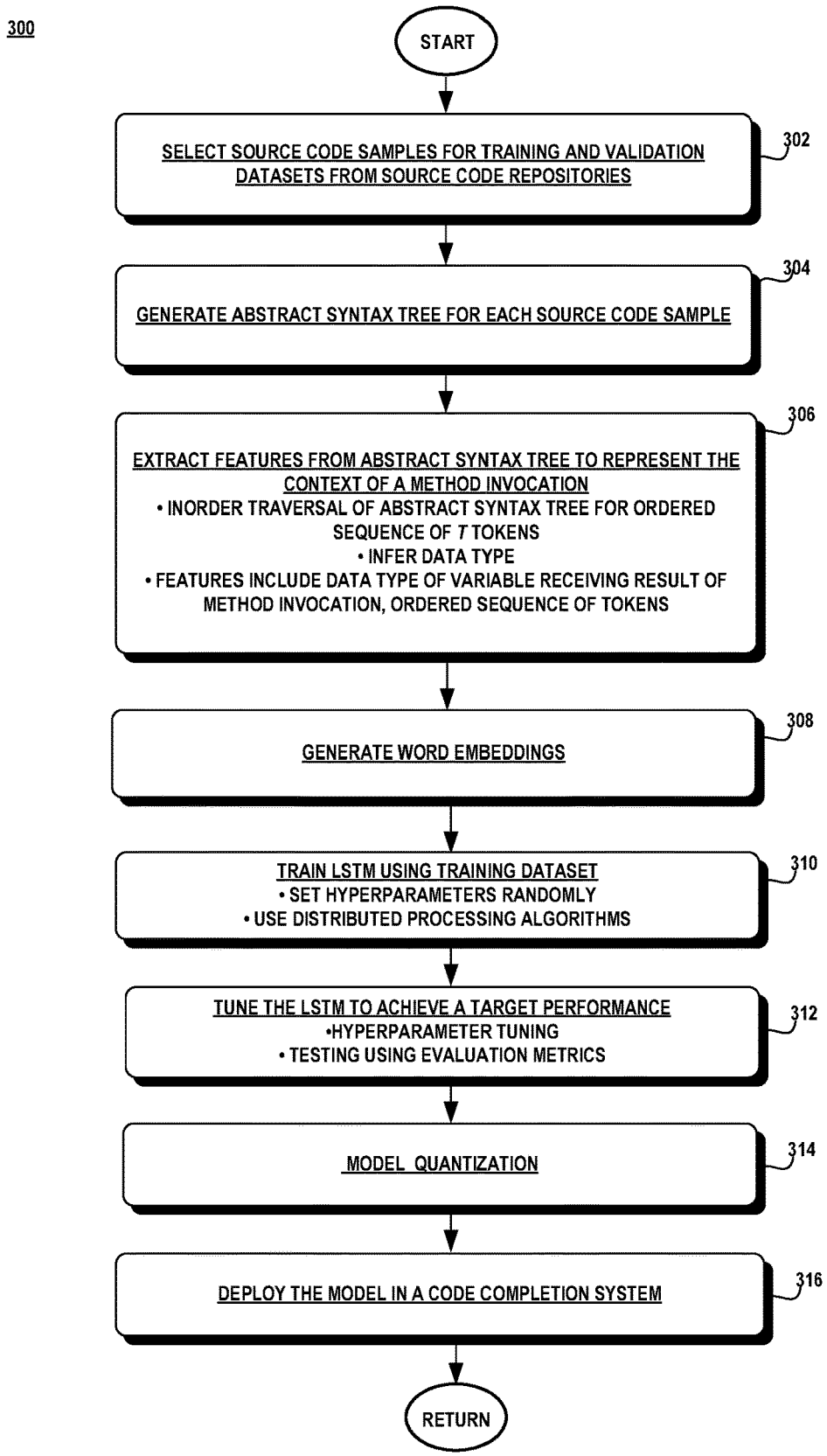
FIG. 3 is a flow diagram illustrating an exemplary method for generating the deep learning model.

FIG. 3 illustrates an exemplary method 300 illustrating the training of the deep learning model. Referring to FIGS. 1 and 3, one or more source code repositories 106 are searched for source code programs written in a target programming language. The source code repositories 106 can be widely-used code repositories, such as GitHub, internal code repositories, and/or combinations thereof. The source code extraction component 108 extracts a number and type of source code programs that meet an intended objective, such as source code programs that are accessed frequently, source code programs that utilize a particular function (e.g., database operations, computer graphics programs, asynchronous methods, etc.), and the like. These source code programs are used to generate training and validation datasets (collectively, block 302).

Each selected source code program 110 is then parsed and/or compiled by the compilation component 112 to produce an abstract syntax tree (block 304).

For each method invocation in a selected source code program 110, a feature vector is generated representing the syntactic context of the method invocation (block 306). The feature vector is an ordered sequence of T tokens representative of the context of a complete method invocation. The ordered sequence of tokens is a serialized sequence of syntax nodes and tokens from the abstract syntax tree and the runtime data type of the variable assigned to the result of the method invocation. The runtime data type of the variable is determined from traditional compiler techniques such as type inference, contextual typing, duck typing, and the like.

The serialized sequence of syntax nodes and tokens is obtained from traversing the abstract syntax tree in depth first order (i.e., depth first search, depth first traversal). A depth first traversal starts at a root node and traverses the tree in a single path until it reaches a terminal or leaf node. The traversal then backtracks until it can choose another path to traverse. This process is repeated until all nodes are visited (collectively, block 306).

Next, the feature vectors are transformed into numeric vectors and then into word embeddings (block 308). The syntax nodes and token names are mapped to integers from 1 to V, where V is the size of the token vocabulary. The integers in a word embedding represent an index into the vocabulary that represents a particular token. Infrequently used tokens are removed in order to reduce the vocabulary size. Tokens that are not part of the vocabulary (i.e., out-of-vocabulary tokens) are mapped to integers greater than the vocabulary size, V, so that occurrences of the same out-of-vocabulary token is represented by the same token. Variable names chosen by a developer often differ between the different source code programs. Keeping the variable names in the vocabulary increases the vocabulary size and makes the code completion system dependent on the spelling of a variable name. In order to avoid this situation, the variable names are normalized (collectively, block 308).

Next, the word embeddings 118 are input into the model training component 120 to train the LSTM (block 310). Before the deep learning model is trained, a set of hyperparameters is selected randomly (block 310). A hyperparameter is a parameter associated with the model training algorithms and is set before the start of the model training A hyperparameter is not learned by the deep learning or neural network. The hyperparameters are initialized with random values and then tuned based on the performance of the LSTM when tested using the validation dataset. Table I below lists the hyperparameters that may be used to train the LSTM for code completion.

TABLE 1

| HYPERPARAMETER | DESCRIPTION | BEST VALUE |
|---|---|---|
| $\Lambda$ | Learning rate | 0.002 |
| $Y$ | Learning rate decay per epoch | 0.97 |
| N | Number of recurrent neural network layers | 2 |
| $d_h$ | Number of hidden units in LSTM, per layer | 100 |
| T | Number of lookback tokens, timesteps through which the backpropagation runs | 100 |
| Type of recurrent neural network | Type of recurrent neural network | LSTM |
| $d_b$ | Batch size | 256 |
| Loss function | Type of loss function | Categorical cross-entropy |
| $d_x$ | Embedded vector dimension | 150 |
| Optimizer | Stochastic optimization scheme | Adam |
| Dropout | Dropout keep probability | 0.8 |
| L2 Regularization | Weight regularization of all layers | 10 |
| Clip norm | Maximum norm of gradients | 10 |
| Token frequency threshold | Minimum frequency of syntax token in the corpus for inclusion in the vocabulary | 500 |

The training of the LSTM is a computationally intensive effort which requires parallel data processing. One or more clusters may be used to train the LSTM where each cluster contains a set of loosely or tightly coupled computers (e.g., processors, processing units, cores) that perform the same task simultaneously under the control of distributed controller. Each computer works off the same copy of the LSTM and uses distributed data parallel training algorithms to synchronize the processing between the clusters (collectively, block 310).

The LSTM is trained using batching where the training dataset is partitioned into batches of a certain size and processed before the deep learning model is updated. The size of a batch must be more than or equal to one and less than or equal to the number of samples in the training dataset (collectively, block 310).

Figure 4:
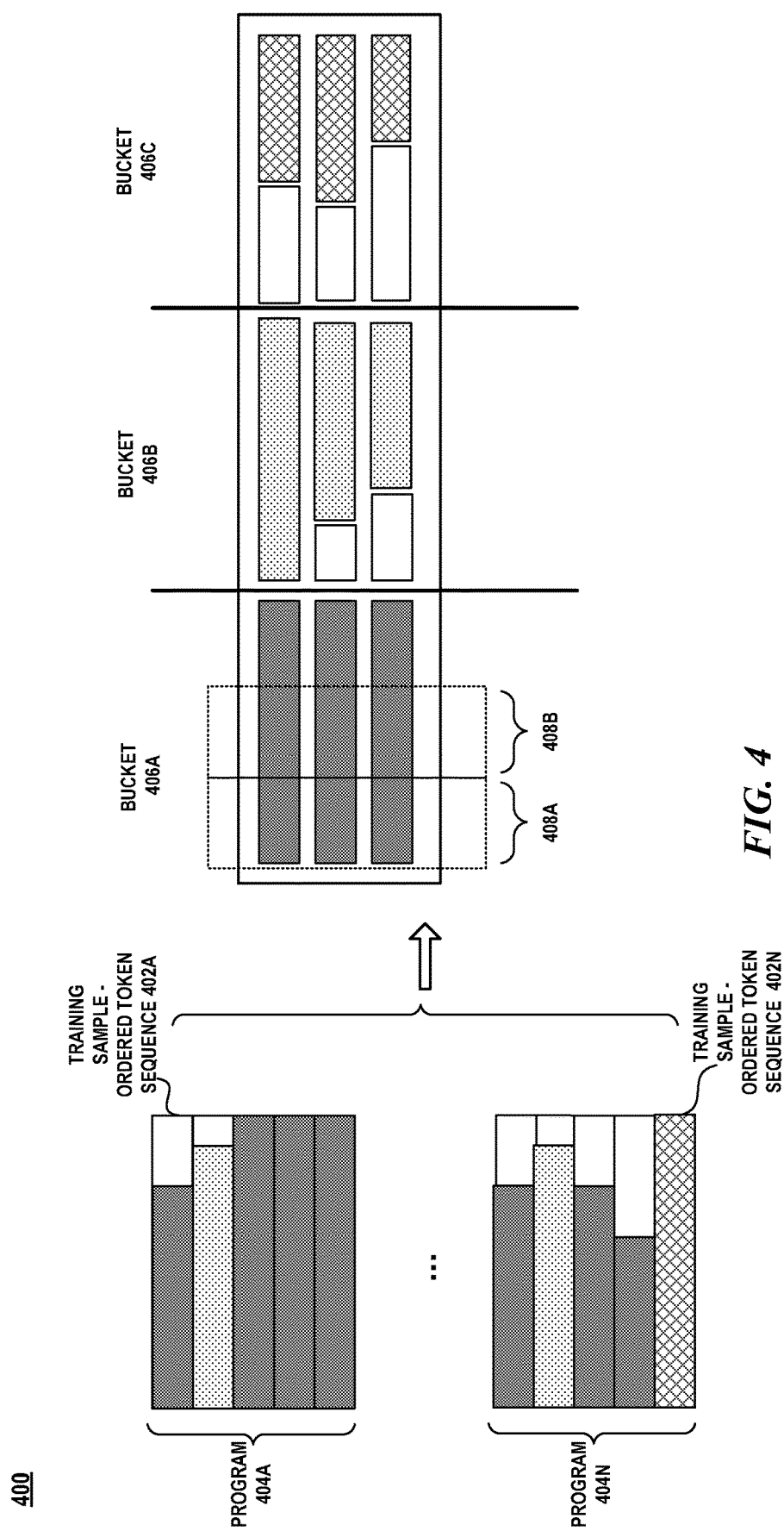
FIG. 4 is a schematic diagram illustrating the batching of the training dataset used to train the deep learning model.

FIG. 4 illustrates an exemplary batching technique used in training the deep learning model. As shown in FIG. 4, each training sample 402A-402N from each source code program 404A-404N is an ordered sequence of tokens having varying lengths with a maximum length of T. The training samples are pre-sorted and split into three buckets based on their length 406A, 406B, 406C. Within each bucket 406A, 406B, 406C, the token sequences are padded to the maximum length using a special padding token which is excluded from the cross-entropy loss calculation through masking. A training buffer maintains the token sequences belonging to $d_b$ distinct token sequences. At every training step 408A, 408B, the first $T_{RNN}$ timesteps of the buffer are fed as the next batch. The buffer is shifted by $T_{RNN}$. Every time a sequence is finished in the buffer, a new set of sequences in loaded and the LSTM internal states are reset for training (collectively, block 310).

Deep learning models are typically trained via a stochastic optimization procedure. There are different types of stochastic gradient descent optimizers and Adam, Adaptive Movement Estimation, is used by the model training component 120. A learning rate tells the optimizer how far to move the weights in the direction opposite of the gradient for a mini-batch. If the learning rate is low, then training is more reliable, but optimization will take a lot of time because steps towards the minimum of the loss function are tiny. If the learning rate is high, then training may not converge or even diverge. Weight changes can be so big that the optimizer overshoots the minimum and makes the loss worse (collectively, block 310).

An exponential learning rate schedule is used as follows: $\lambda_i = \lambda_0 * \gamma^i$, where $\lambda_0$ is the base learning rate, $\gamma$ is the learning rate decay constant, and i is the epoch number. An epoch is a complete pass through a training dataset. In the parallel distributed training process, the learning rate is scaled up during the first few epochs of the training to facilitate reliable model convergence. The learning rate is linearly scaled-up thereafter proportionally to the number of processing units used in the distributed training process, $N_{worker}$, during a warm-up period of four epochs as follows:

$$\lambda_0(N_{worker}) = \lambda_0 \frac{N_{worker}}{\alpha},$$

where $\alpha$ is the scaling fraction controlling the maximum value of the learning rate at the end of the warmup period, and $N_{worker}$ is the number of processing units used in all the clusters (collectively, block 310).

Before the LSTM is trained, a set of hyperparameters is selected randomly and then tuned to achieve a desired performance. The LSTM is tested using a validation dataset to determine the appropriate hyperparameters settings to achieve a desired goal. When the desired goal is not achieved, one or more hyperparameters are adjusted and the training is repeated until the target goal is achieved (collectively, block 312).

Evaluation metrics are used to test the quality of the candidate recommendations. In one aspect, a top-k accuracy method is used using mean reciprocal rank (MRR) to perform the evaluation. Top-k accuracy is defined as:

$$Acc(k) = \frac{N_{top-k}}{Q},$$

and MMR is defined as:

$$MRR = \frac{1}{Q}\sum_{i=1}^{Q}\frac{1}{rank_i},$$

where $N_{top-k}$ denotes the number of relevant recommendations in the top k suggestions, Q represents the total number of test data samples, and $rank_i$ is the prediction rank of a recommendation.

Accuracy in the top-1 indicates how often the top recommendation is correct, while the top-5 accuracy indicates how often the top three recommendations in the list contain the candidate the user is looking for. The MRR captures the rank of the result, thus providing information outside of the top candidate. A larger value of the MRR indicates the overall smaller rank numbers of correct recommendations. (collectively, block 312).

Once the LSTM is tested to a desired target goal, model quantization is performed (block 314). Neural network quantization is needed in order to reduce the number of bits used to store the weights. In order to reduce memory, network bandwidth, and the size of the model, the weights are converted from a 32-bit floating format into an 8-bit unsigned integer numeric format. Quantization is performed layer-by-layer extracting minimum and maximum values of weights and activations in the floating point format, zero shifting, and scaling. Given a weight, $W=w_{ij}$, for a layer, the quantized matrix $W^q$ is obtained as follows:

$$\beta = \frac{\max(W) - \min(W)}{2^8}, w^q_{ij} = \frac{w_{ij} - \min(W)}{\beta}. \text{ (collectively, block 314)}.$$

Upon completion of the model quantization, the LSTM is ready to be deployed in a code completion system (block 316). Attention now turns to a discussion of the use of the deep learning model for code completion.

Figure 5:
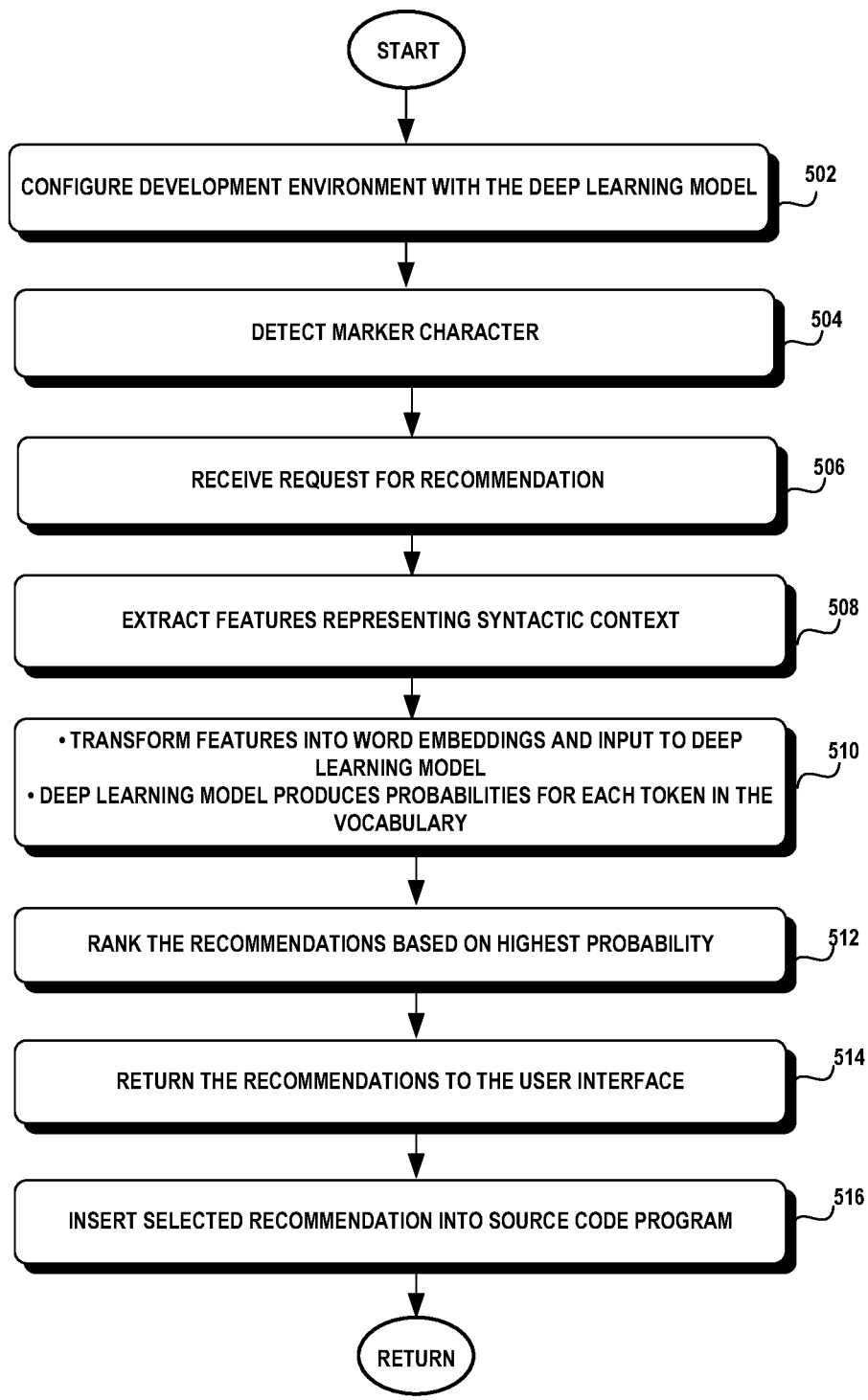
FIG. 5 is a flow diagram illustrating an exemplary method for utilizing the deep learning model for code completion.

FIG. 5 illustrates an exemplary method 500 of code completion utilizing the deep learning model. Referring to FIGS. 1 and 5, code completion is performed in a development environment such as a source code editor 130. The source code editor 130 is configured to interact with a code completion component 142 that utilizes the deep learning model (block 502). The source code editor 130 performs a background parsing process that parses the source code in the source code editor to generate and update the abstract syntax tree of the source code (block 502).

The user interface 132 of the source code editor 130 detects the input characters that a developer enters into the source code editor 130. When the user interface 132 detects the marker character that denotes code completion is needed for a partial method invocation at a current position in the source code editor 130 (block 504), the user interface 132 requests recommendations 138 from the code completion component 142 (block 506). In one aspect, the detection of a period after a class name is used as the trigger to invoke code completion (block 504).

The token sequence extraction component 116 utilizes the abstract syntax tree generated during the source code editing session to obtain the features needed to represent the syntactic context of the current method invocation (block 508). At this point, the token sequence contains the marker character and the tokens preceding the marker character (block 508).

The token sequence extraction component 116 transforms the features into word embeddings 144 which are input to the deep learning model 122 (block 510). The deep learning model outputs a probability for each token in the vocabulary (block 510). The tokens are ranked and the tokens with the k top highest probabilities are output by the deep learning model 122 (block 512). The k top recommendations are the candidates 136 that are returned to the user interface 132 for display to the developer (block 514). A user may select at least one of the candidates 136 which is then input into the source code program to complete the method invocation (block 516). The process is repeated (blocks 506-516) until the user closes the source code program.

Exemplary Operating Environment

Figure 6:
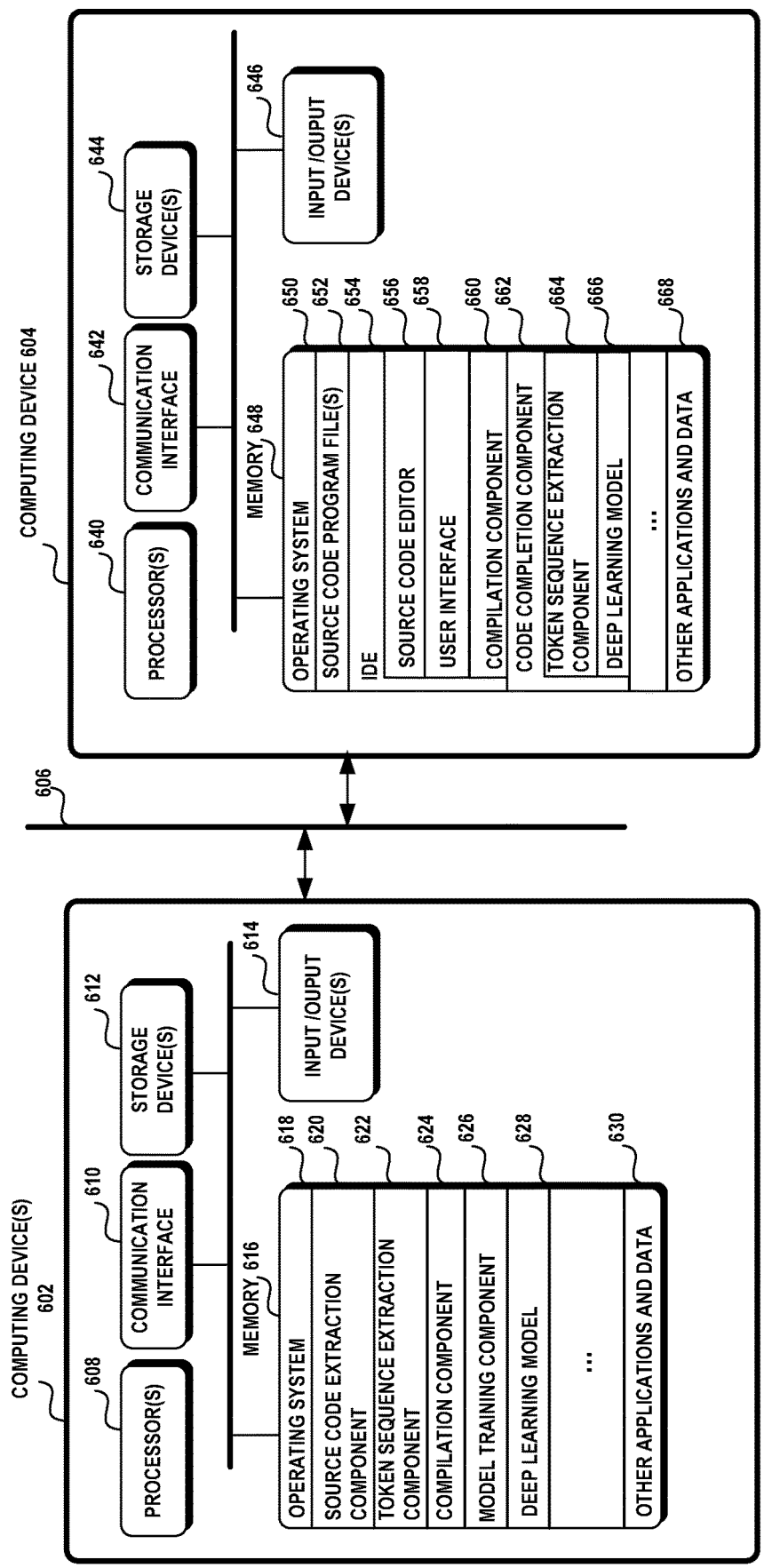
FIG. 6 is a block diagram illustrating an operating environment.

Attention now turns to a discussion of an exemplary operating environment. FIG. 6 illustrates an exemplary operating environment 600 in which one or more computing devices 602 is used to train the deep learning model and a second computing device 604 that uses the deep learning model for code completion. However, it should be noted that the aspects disclosed herein is not constrained to any particular configuration of devices. Any one of the computing devices 602 may utilize the deep learning model in its own code completion system and computing device 604 may generate and test the deep learning model as well. Computing devices 602 may be configured as a cloud service that generates the deep learning model as a service for other code completion systems. It should be noted that the operating environment is not limited to any particular configuration and other configurations are possible.

The computing devices 602, 604 may be any type of electronic device, such as, without limitation, a mobile device, a personal digital assistant, a mobile computing device, a smart phone, a cellular telephone, a handheld computer, a server, a server array or server farm, a web server, a network server, a blade server, an Internet server, a work station, a mini-computer, a mainframe computer, a supercomputer, a network appliance, a web appliance, a distributed computing system, multiprocessor systems, or combination thereof. The operating environment 600 may be configured in a network environment, a distributed environment, a multi-processor environment, or a stand-alone computing device having access to remote or local storage devices.

The computing devices 602, 604 may include one or more processors 608, 640, a communication interface 610, 642, one or more storage devices 612, 644, one or more input/output devices 614, 646, and a memory 616, 648. A processor 608, 640 may be any commercially available or customized processor and may include dual microprocessors and multi-processor architectures. The communication interface 610, 642 facilitates wired or wireless communications between the computing device 602, 604 and other devices. A storage device 612, 644 may be computer-readable medium that does not contain propagating signals, such as modulated data signals transmitted through a carrier wave. Examples of a storage device 612, 644 include without limitation RAM, ROM, EEPROM, flash memory or other memory technology, CD-ROM, digital versatile disks (DVD), or other optical storage, magnetic cassettes, magnetic tape, magnetic disk storage, all of which do not contain propagating signals, such as modulated data signals transmitted through a carrier wave. There may be multiple storage devices 612, 644 in the computing devices 602, 604. The input/output devices 614, 646 may include a keyboard, mouse, pen, voice input device, touch input device, display, speakers, printers, etc., and any combination thereof.

A memory 616, 648 may be any non-transitory computer-readable storage media that may store executable procedures, applications, and data. The computer-readable storage media does not pertain to propagated signals, such as modulated data signals transmitted through a carrier wave. It may be any type of non-transitory memory device (e.g., random access memory, read-only memory, etc.), magnetic storage, volatile storage, non-volatile storage, optical storage, DVD, CD, floppy disk drive, etc. that does not pertain to propagated signals, such as modulated data signals transmitted through a carrier wave. A memory 616, 648 may also include one or more external storage devices or remotely located storage devices that do not pertain to propagated signals, such as modulated data signals transmitted through a carrier wave.

Computing device 604 may utilize an integrated development environment (IDE) 654 that allows a user (e.g., developer, programmer, designer, coder, etc.) to design, code, compile, test, run, edit, debug or build a program, set of programs, web sites, web applications, and web services in a computer system. Software programs can include source code files, created in one or more source code languages (e.g., Visual Basic, Visual J#, C++. C#, J#, Java Script, APL, COBOL, Pascal, Eiffel, Haskell, ML, Oberon, Perl, Python, Scheme, Smalltalk and the like). The IDE 654 may provide a native code development environment or may provide a managed code development that runs on a virtual machine or may provide a combination thereof. The IDE 654 may provide a managed code development environment using the .NET framework. It should be noted that this operating embodiment is not constrained to providing the source code development services through an IDE and that other tools may be utilized instead, such as a stand-alone source code editor and the like.

A user can create and/or edit the source code program files 652 according to known software programming techniques and the specific logical and syntactical rules associated with a particular source language via a user interface 658 and a source code editor 656 in the IDE 654. Thereafter, the source code program files 652 can be compiled via a compilation component 660 generating data structures representing the syntactic structure and semantic model of the source code.

The memory 648 of computing device 604 may contain instructions, components, and data. A component is a software program that performs a specific function and is otherwise known as a module, program, and/or application. The memory 648 may include an operating system 650, one or more source code program files 652, an IDE 654 that may include a source code editor 656, a user interface 658, a compilation component 660, a code completion component 662 having a token sequence extraction component 664 and the deep learning model 666 and other applications and data 668.

The memory 616 of the computing devices 602 may include an operating system 618, a source code extraction component 620, a token sequence extraction component 622, a compilation component 624, a model training component 626, a deep learning model 628, and other applications and data 630.

The computing devices 602, 604 may be communicatively coupled via a network 606. The network 606 may be configured as an ad hoc network, an intranet, an extranet, a virtual private network (VPN), a local area network (LAN), a wireless LAN (WLAN), a wide area network (WAN), a wireless WAN (WWAN), a metropolitan network (MAN), the Internet, a portions of the Public Switched Telephone Network (PSTN), plain old telephone service (POTS) network, a wireless network, a WiFi® network, or any other type of network or combination of networks.

The network 606 may employ a variety of wired and/or wireless communication protocols and/or technologies. Various generations of different communication protocols and/or technologies that may be employed by a network may include, without limitation, Global System for Mobile Communication (GSM), General Packet Radio Services (GPRS), Enhanced Data GSM Environment (EDGE), Code Division Multiple Access (CDMA), Wideband Code Division Multiple Access (W-CDMA), Code Division Multiple Access 2000, (CDMA-2000), High Speed Downlink Packet Access (HSDPA), Long Term Evolution (LTE), Universal Mobile Telecommunications System (UMTS), Evolution-Data Optimized (Ev-DO), Worldwide Interoperability for Microwave Access (WiMax), Time Division Multiple Access (TDMA), Orthogonal Frequency Division Multiplexing (OFDM), Ultra Wide Band (UWB), Wireless Application Protocol (WAP), User Datagram Protocol (UDP), Transmission Control Protocol/Internet Protocol (TCP/IP), any portion of the Open Systems Interconnection (OSI) model protocols, Session Initiated Protocol/Real-Time Transport Protocol (SIP/RTP), Short Message Service (SMS), Multimedia Messaging Service (MMS), or any other communication protocols and/or technologies.

Conclusion

A system is disclosed having one or more processors and a memory. The memory has one or more programs having instructions that are stored in the memory and which are configured to be executed by the one or more processors. The one or more programs include instructions that: detect in a source code editor, an input character signaling an initiation of a method invocation; and predict at least one method to complete the method invocation using a deep learning model, wherein the deep learning model is trained on ordered sequences of a context of the method invocation from source code programs. The instructions have further instructions that: extract features representing the context of the method invocation; and transform the features into numeric values. The extracted features include a syntactic representation of the context of the method invocation from an abstract syntax tree of source code surrounding the method invocation. The extracted features include a runtime type of a variable receiving a result of the method invocation. The ordered sequence of the context includes tokens obtained from a depth-first traversal of the abstract syntax tree. The deep learning model is a long short term memory network.

A method is disclosed comprising: obtaining training samples to train a deep learning model, the training samples representing a plurality of ordered sequences of tokens, an ordered sequence of tokens represents a syntactic context of a method invocation; inputting the training samples into the deep learning model; training the deep learning model with the training samples to output, a plurality of probabilities, a probability associated with a select token from a vocabulary of tokens used in the plurality of ordered sequences of tokens; and incorporating the deep learning model into a code completion tool for use in completing a code fragment initiating a method invocation.

The method further comprises generating at least one predicted embedded vector representing a training sample, the at least one predicted embedded vector obtained as the product of a last temporal hidden state of the deep learning model and a linear projection matrix. The training samples are word embeddings derived from the plurality of ordered sequences of tokens.

The method further comprises calculating the plurality of probabilities as a product of the word embeddings and the at least one predicted embedded vector and generating at least one ordered sequence of tokens from an abstract syntax tree representation of a code snippet initiating the method invocation. The training of the deep learning model further comprises training the deep learning model using a plurality of parallel distributed clusters. The training of the deep learning model further comprises using a stochastic gradient descent optimization process to minimize a categorical cross-entropy loss function and using backpropagation through time process to update weights of the deep learning model.

A device is disclosed having at least one processor and at least one memory device. The at least one processor is configured to: obtain a training dataset from source code programs having method invocations, the training dataset including a plurality of ordered sequences of tokens that represent a syntactic context of a method invocation; use the training dataset to train a deep learning model to output, a plurality of probabilities, a probability associated with a select token from a vocabulary of tokens used in the plurality of ordered sequences of tokens; and provide the deep learning model into a code completion component to facilitate completion of a method invocation based on the plurality of probabilities generated from the deep learning model.

The deep learning model is a long short term memory network. The plurality of ordered sequence of tokens is derived from an abstract syntax tree representing a code snippet containing the method invocation. The training dataset is used to train a deep learning model to output, a plurality of probabilities further comprises actions that: generate at least one predicted embedded vector representing a training sample of the training dataset, the at least one predicted embedded vector obtained as the product of a last temporal hidden state of the deep learning model and a linear projection matrix. The training sample is a word embedding. The device is further configured to calculate the plurality of probabilities as a product of the word embeddings and the predicted embedded vector.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed:

1. A method, comprising:
   obtaining training samples to train a deep learning model, the training samples representing a plurality of ordered sequences of tokens, an ordered sequence of tokens represents a syntactic context of a method invocation;
   inputting the training samples into the deep learning model;
   training the deep learning model with the training samples to output, a plurality of probabilities, a probability associated with a select token from a vocabulary of tokens used in the plurality of ordered sequences of tokens, wherein during the training of the deep learning model, at least one predicted embedding vector is generated representing a training sample, the at least one predicted embedding vector obtained as the product of a last temporal hidden state of the deep learning model and a linear projection matrix; and
   incorporating the deep learning model into a code completion tool for use in completing a code fragment initiating a method invocation.

2. The method of claim 1, wherein the syntactic context of the method invocation includes a datatype of a return value of the method invocation.

3. The method of claim 1, wherein the deep learning model is based on one or more a long short-term memory networks.

4. The method of claim 1, further comprising:
   calculating the plurality of probabilities as a product of the word embeddings and the at least one predicted embedding vector.

5. The method of claim 1, further comprising:
   generating at least one ordered sequence of tokens from an abstract syntax tree representation of a code snippet initiating the method invocation.

6. The method of claim 1, wherein training the deep learning model further comprises:
   training the deep learning model using a plurality of parallel distributed clusters.

7. The method of claim 1, wherein training the deep learning model further comprises:
   using a stochastic gradient descent optimization process to minimize a categorical cross-entropy loss function.

8. The method of claim 1, wherein training the deep learning model further comprises:
  using backpropagation through time process to update weights of the deep learning model.

9. A device, comprising:
  at least one processor and at least one memory device;
  wherein the at least one processor is configured to execute instructions on the at least one memory device to perform acts that:
    obtain a training dataset from source code programs having method invocations, the training dataset including a plurality of ordered sequences of tokens that represent a syntactic context of a method invocation;
    use the training dataset to train a deep learning model to output, a plurality of probabilities, a probability associated with a select token from a vocabulary of tokens used in the plurality of ordered sequences of tokens, wherein during the training of the deep learning model, at least one predicted embedding vector is generated representing a training sample, the at least one predicted embedding vector obtained as the product of a last temporal hidden state of the deep learning model and a linear projection matrix; and
    provide the deep learning model into a code completion component to facilitate completion of a method invocation based on the plurality of probabilities generated from the deep learning model.

10. The device of claim 9, wherein the deep learning model is based on a long short term memory network.

11. The device of claim 9, wherein the plurality of ordered sequence of tokens is derived from an abstract syntax tree representing a code snippet containing the method invocation.

12. The device of claim 9, wherein the at least one processor is further configured to perform acts that:
  perform model quantization prior to providing the deep learning model into a code completion component.

13. The device of claim 9, wherein the syntactic context of the method invocation includes a datatype of a return value of the method invocation.

14. The device of claim 9, wherein the at least one processor is further configured to perform acts that:
  calculate the plurality of probabilities as a product of the word embeddings and the predicted embedding vector.

15. A system, comprising:
  one or more processors; and a memory;
  one or more programs, wherein the one or more programs are stored in the memory and configured to be executed by the one or more processors, the one or more programs including instructions that:
  train a deep learning model to learn a probability distribution for a vocabulary of tokens from a training dataset, the training dataset including a plurality of ordered sequences of tokens obtained from source code programs having method invocations, wherein an ordered sequence of tokens represents a syntactic context of a method invocation,
  wherein during the training of the deep learning model, at least one predicted embedding vector is generated representing a training sample from the training dataset, the at least one predicted embedding vector obtained as the product of a last temporal hidden state of the deep learning model and a linear projection matrix; and
  deploy the deep learning model to predict candidates to complete a target method invocation.

16. The system of claim 15, wherein the probability distribution is based on a product of word embeddings of the training dataset and the at least one predicted embedding vector.

17. The system of claim 15, wherein the syntactic context of a method invocation includes a data type of a return value from the method invocation.

18. The system of claim 15, wherein the one or more programs including further instructions that:
  perform model quantization prior to deployment of the deep learning model.

19. The system of claim 15, wherein the deep learning model is based on a long short-term memory network.

20. The system of claim 15, wherein one or more of the tokens of the vocabulary of tokens represent method names.

* * * * *